UNITED STATES PATENT OFFICE.

ARIEL D. KIZER, OF MISHAWAKA, INDIANA.

COMPOSITION FOR FELTING BOOTS, &c.

SPECIFICATION forming part of Letters Patent No. 423,479, dated March 18, 1890.

Application filed April 26, 1889. Serial No. 308,727. (No specimens.)

*To all whom it may concern:*

Be it known that I, ARIEL D. KIZER, a citizen of the United States, residing at Mishawaka, in the county of St. Joseph and State of Indiana, have invented certain new and useful Improvements in Composition for Felting Boots, &c.; and I do declare the following to be a full, clear, and exact description of the invention, such as will enable others skilled in the art to which it appertains to make and use the same.

My invention relates to a composition of matter for felting boots or other felt articles; and it consists of the following ingredients combined in the manner stated, namely: alum, oil of vitriol, and water.

In preparing the composition I take three common pailfuls of alum and put it in a tank that will hold from four to five barrels of water, more or less, and turn on the steam until the water has become quite warm or hot. I then put in four quarts of the oil of vitriol and boil about five minutes, after which it is ready for use. The goods to be felted must be in the fuller, the steam being turned on to keep the goods warm and not too hot, so that they may not become hard or stiff. The proportions of the alum and oil of vitriol may be varied, and it depends greatly upon the judgment of the operator and the temperature of the room and weather. I have found that it takes less of the ingredients in warm weather than in cold weather. When an alkali is used, I find that the moal becomes very hard and breaks very readily, while by the use of alum with the oil of vitriol the fulling is closer and the moal remains soft and pliable.

Having described my invention, what I claim is—

The herein-described composition of matter to be used for felting shoes and other articles, consisting of alum, oil of vitriol, and water, combined in the manner substantially as specified.

In testimony whereof I affix my signature in presence of two witnesses.

ARIEL D. KIZER.

Witnesses:
 JOHN F. EBERLEIN,
 JOHN J. SCHINDLER.